United States Patent
Ibarra Von Borstel et al.

(10) Patent No.: US 11,954,462 B2
(45) Date of Patent: Apr. 9, 2024

(54) DUAL BAYESIAN ENCODING-DECODING TECHNIQUE FOR TEXT TO CODE TRANSFORMATIONS

(71) Applicant: Intel Corporation, Santa Clara, CA (US)

(72) Inventors: Alejandro Ibarra Von Borstel, Manchaca, TX (US); Fernando Ambriz Meza, Manchaca, TX (US); David Israel Gonzalez Aguirre, Portland, OR (US); Walter Alejandro Mayorga Macias, Austin, TX (US); Rocio Hernandez Fabian, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 17/499,749

(22) Filed: Oct. 12, 2021

(65) Prior Publication Data
US 2022/0035605 A1    Feb. 3, 2022

(51) Int. Cl.
G06F 9/44 (2018.01)
G06F 8/35 (2018.01)
G06F 8/41 (2018.01)
G06N 20/00 (2019.01)

(52) U.S. Cl.
CPC ............. *G06F 8/35* (2013.01); *G06F 8/427* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 10,169,208 | B1* | 1/2019 | Moyes | G06F 8/427 |
| 10,963,652 | B2* | 3/2021 | Hashimoto | G06N 3/088 |
| 11,295,081 | B1* | 4/2022 | Federico | G06N 3/08 |
| 11,474,797 | B2* | 10/2022 | Forghani | G06F 8/4441 |
| 11,822,897 | B2* | 11/2023 | Hashimoto | G06N 3/045 |

(Continued)

OTHER PUBLICATIONS

Cruz-Benito, Juan, et al, "Automated Source Code Generation and Auto-completion Using Deep Learning: Comparing and Discussing Current Language-Model-Related Approaches," arXiv:2009.07740v4 [cs.CL], Jan. 12, 2021, 11 pages.

(Continued)

*Primary Examiner* — Qamrun Nahar
(74) *Attorney, Agent, or Firm* — Compass IP Law PC

(57) ABSTRACT

Methods, apparatus, and software for implementing dual Bayesian encoding-decoding for text-to-code transformations. In one aspect, a multi-model probabilistic source code model employing dual Bayesian encoder-decoder models is used to convert natural language (NL) inputs (aka requests) into source code. An NL input is processed to generate a Probabilistic Distribution (PD) of Source code (SC) tokens in an SC token sequence and a PD of Abstract Syntax Tree (AST) tokens in an AST token sequence, wherein each SC token is associated with a respective AST token, and each of the SC and AST tokens have a respective PD. One or more fixing rules are applied to one or more tokens SC tokens that are identified as needing fixing, wherein the fixing rule are selected in consideration of the PDs of the SC tokens and the PDs of their associated AST tokens.

20 Claims, 9 Drawing Sheets

(56) References Cited

U.S. PATENT DOCUMENTS

2019/0303211 A1* 10/2019 Dias ................. G06F 8/433
2022/0382527 A1* 12/2022 Wang ................. G06F 8/427

OTHER PUBLICATIONS

Liu, Shangqing, et al, "Retrieval-Augmented Generation for Code Summarization via Hybrid GNN," arXiv.2006.05405v5 [cs.LG], May 13, 2021, 16 pages.
Lui, Xuye, et al, "HAConvGNN: Hierarchical Attention Based Convolutional Graph Neural Network for Code Documentation Generation in Jupyter Notebooks," arXiv:2104.01002v2 [cs.SE], Sep. 8, 2021, 13 pages.
Yin, Pengcheng, et al, "A Syntactic Neural Model for General-Purpose Code Generation," zrXiv:1704.01696v1 [cs. CL], Apr. 6, 2017, 14 pages.

\* cited by examiner

DUAL BAYESIAN ENCODING-DECODING TECHNIQUE FOR TEXT TO CODE TRANSFORMATIONS

BACKGROUND INFORMATION

Approaches and Machine Learning (ML) frameworks for Natural Language Processing (NLP) have seen significant advancement in the past decade. In particular, Deep Learning (DL) techniques have shown an increase in performance on NLP tasks such as Meaning Extraction, Named Entity Recognition, Question & Answering and Machine Translation. However, one subdomain of Natural Language (NL) that has received less focus in NL translation into source code.

Writing error-free source code is an enormously difficult task, especially for complex software systems. Even the most experienced programmers and developers may have difficulties writing source code. Statistics from the use of online forums provides evidence to how widespread the difficulties are. For example, the 16 million users of Stack Overflow have posted 22 million questions, provided 32 million answers, and visit the site 11 million time per day (recent average). Oftentimes, users need to ask others or search the web to find the proper syntax or find solutions to known code implementations.

Searching Big-Code databases like GitHub or Stack Overflow (among others) is often very time consuming; therefore, the use of DL and Probabilistic models is gaining interest to automate source code generation. Accurate and reduced computational cost technologies are needed to provide an advantage to companies that depend on Software/Firmware development to reduce the time to market of their software and hardware products.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 1b is a diagram showing further tokens and probabilities generated by the multi-model probabilistic source code model of FIG. 1a;

FIG. 5 shows a Python code snippets corresponding to a Deterministic Grammar Dictionary (dgd), a Source code Vocabulary List (svl), and a Non-defined List (ndl);

FIG. 7 is a portion of a Pandas data frame showing various data and fields obtain via processing the CoNaLa dataset;

DETAILED DESCRIPTION

Figure 1A:
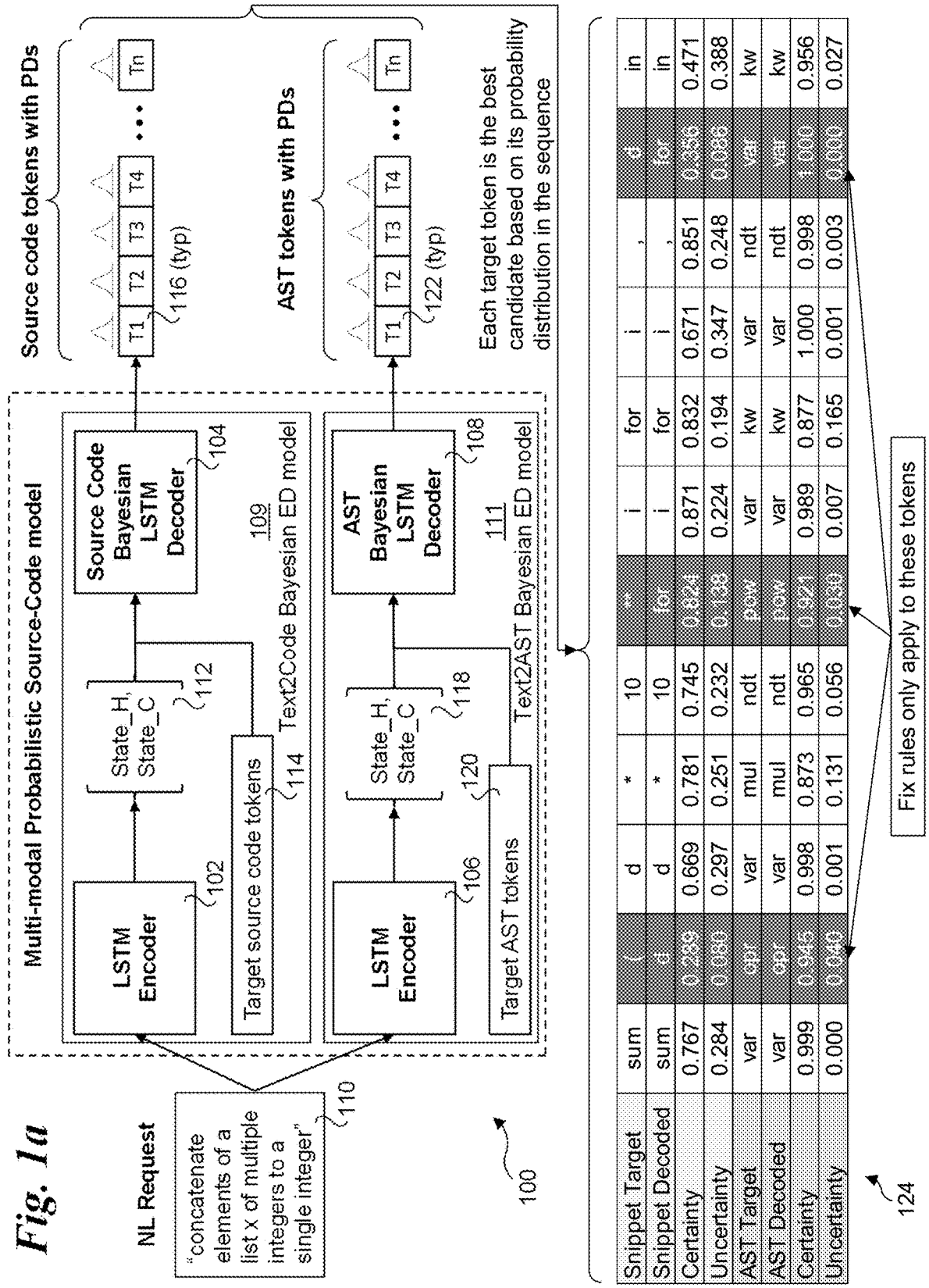
FIG. 1a is a block diagram of a multi-model probabilistic source code model and an exemplary output table including source code (SC) tokes and Abstract Syntax Tree (AST) generated from processing an input Natural Language (NL) request, according to one embodiment.

Embodiments of methods, apparatus, and software for implementing dual Bayesian encoding-decoding for text-to-code transformations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the Figures for simplicity and clarity or otherwise similar components that are not labeled with separate reference numbers. Conversely, "(typ)" is not to be construed as meaning the component, element, etc. is typically used for its disclosed function, implement, purpose, etc.

The structure of source code can become extremely complex and may use a widely open vocabulary. To address this, most current models (DL or Probabilistic) tend to simplify their scope by implementing structural representations like Abstract Syntax Tree (AST)/Graphs, open vocabulary models and attention mechanisms. Unfortunately, the implementation of these approaches may still lead to computationally intensive solutions or generate code that may not parse, compile, execute and/or solve the problem.

Under the embodiments described and illustrated herein, an approach that merges statistical criteria (Mean and Standard deviation) from two (or any number of) sequences of Probabilistic Distributions that are simultaneously generated by corresponding Bayesian Encoder-Decoder models to dramatically decrease Text to Code transformation time and increase resulting code accuracy. In one embodiment, the simultaneous transformations including Text to AST and Text to Code which are implemented to decrease the grammatical and syntactical inconsistencies from generated source code using confidence metrics like "Uncertainty" and "Certainty" from both model's predictions. The approach enables us to reduce the vocabulary and deterministic rules used to fix the transformed code.

The solution begins by defining a Deep Learning model that provides enhanced predictions with confidence levels. To achieve this, we build two Encoder-Decoder models with a Dense-Flip out estimation layer at the Decoder's final layer enabling the model to approximate a distribution of each token of the decoded sequence.

The solution has two Bayesian Encoder-Decoder models. One of the Bayesian Encoder-Decoder models is used to extract the meaning of an input NL sentence and provides a decoded output comprising a sequence of source code tokens. The second Bayesian Encoder-Decoder model decodes the same NL sentence into an AST token sequence. Moreover, the intention is to implement these two models in parallel since both training and inferencing phases can be independent and executed in parallel. Also, by having separated token sequences for source code and AST tokens, it allows us to have two sets of confidence for both outputs. The expectation is to have higher levels of confidence regarding the AST token sequence due to its smaller vocabulary compared to the source code vocabulary, meaning that the AST decoder will generalize the NL input in a smaller solution domain, with a higher confidence.

In one embodiment, the levels of confidence from the model are measured by calculating the Epistemic Uncertainty (Standard deviation) and Certainty (mean) from each token prediction of both (source code and AST) decoded sequences.

The upper portion of FIG. 1a shows a block diagram of a multi-model probabilistic source code model 100, according to one embodiment. Model 100 includes an LSTM (Long Short-term Memory) encoder 102, a source code Bayesian LSTM decoder 104, a LSTM encoder 106 and an AST Bayesian LSTM decoder 108. The LSTM encoders 102 and 106 are trained using three sequences of tokens (words, Parts of Speech (PoS) and Dependencies between tokens). LSTM encoder 102 and source code Bayesian LSTM decoder 104 are implemented as a Text-to-source code (Text2Code) Bayesian Encoder-Decoder (ED) model 109, while LSTM encoder 106 and AST Bayesian LSTM decoder 108 are implemented as a Text-to-AST (Text2AST) Bayesian ED model 111.

Multi-model probabilistic source code model 100 is designed to receive NL requests (also referred to as NL input or NL requirements) and convert them into a sequence of source code tokens and a sequence of AST tokens. Source code Bayesian LSTM decoder 104 (or more simply referred to source code Bayesian decoder 104) and AST Bayesian (LSTM) decoder 108 collectively comprises dual Bayesian decoders for source code and AST. Since only the decoder parts of the Text2Code and Text2AST Bayesian ED models are Bayesian, the model complexity is reduced.

Each of LSTM encoders 102 and 106 receive an NL request 110, which in this example is "concatenate elements of a list x of multiple integers to a single integer." LSTM encoder 102 produces a set of hidden states 112, which represent the context or meaning of the NL input sequence that is passed to source code Bayesian LSTM decoder 104. As shown, hidden states 112 include hidden state (State_H) vectors and cell state (State_C) vectors. The hidden state vectors and cell state vectors are accessed by Source code Bayesian LSTM decoder 104, as explained below. Source code Bayesian LSTM decoder 104 also includes an input comprising target source code tokens 114. Source code Bayesian LSTM decoder 104 outputs a sequence of source code tokens 116, each having a respective probability distribution (PD).

LSTM encoder 106 produces a set of hidden states 118 comprising hidden state vectors and cell state vectors, which are accessed by AST Bayesian LSTM decoder 108. AST Bayesian LSTM decoder 108 also includes an input comprising target AST tokens 120. AST Bayesian LSTM decoder 104 outputs a sequence of AST tokens 122, each having a respective probability distribution.

Source code Bayesian LSTM decoder 104 and AST Bayesian LSTM decoder 108 operate in a similar manner. They predict the next token in their respective target sequence based on a current token in consideration of the previous encoder states (State_H and State_C) and the target source code and AST tokens, which represent training data. The training target sequences have a start token so the Decoder will predict the first Source code/AST token from this one (start token) plus the previous Encoder states (State_H and State_C).

Figure 1B:
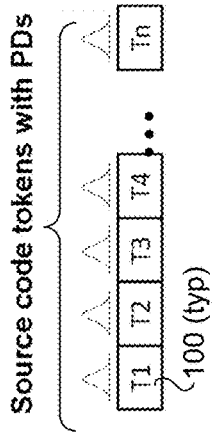
Figure 1B:
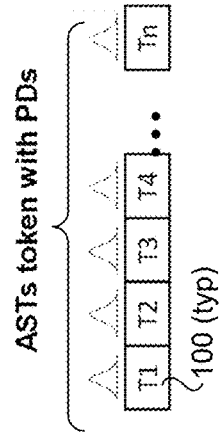
Figure 1B:
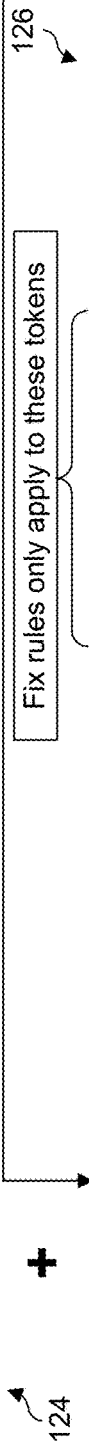

Table 124 shows the output of the Text2Code and Text2AST models. In the sequences, each target token is the best candidate based on its probability distribution in the sequence. For the source code Bayesian LSTM decoder, the rows include a Snippet Target row and a Snippet Decoded row, along with a probabilistic Certainty row and a probabilistic Uncertainty row. Similarly, for the AST Bayesian LSTM decoder the rows include an AST Target row and AST Decoded row along with probabilistic Certainty and Uncertainty rows. The second portion or the source code and AST token sequences and probability values comprising table 126 is shown in FIG. 1b. The Snippet Target row depicts the output of the system after "Fixing Rules" are applied, as discussed below.

Each of the Snippet Target row and the Snippet Decoded row include a sequence of source code tokens, along with certainty and uncertainty probabilities (confidence levels). Meanwhile, each of the AST target row and the AST decoded row include a sequence of AST tokens, such as 'var' (variable), 'opr' (operation), 'mul' (multiplication), ndt (non-defined token), etc. Likewise, each AST token includes certainty and uncertainty confidence levels.

Since the AST vocabulary (comprising target AST tokens 120) is smaller than the source code vocabulary (comprising target source code tokens 114), the AST decoded sequences have better (higher) confidence values. This is a key aspect for defining "Fixing Criteria" and associated rules, as follows.

Figure 2:
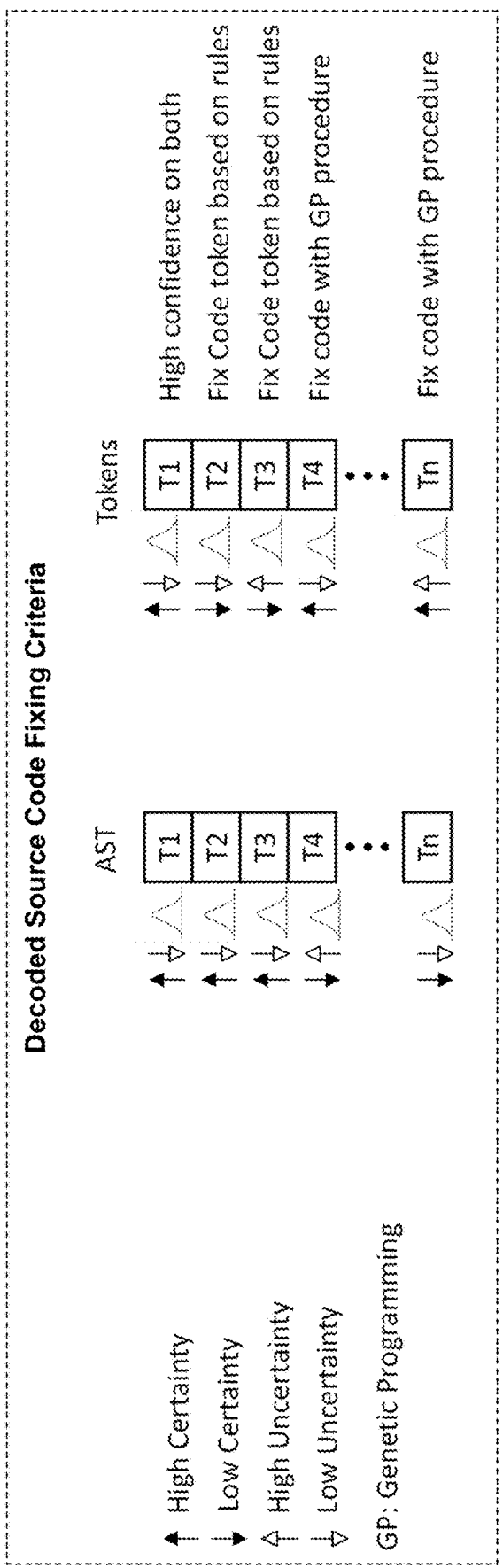
FIG. 2 is a diagram illustrating decoded source code fixing criteria and associated symbols for certainty and uncertainty.

From certainty and uncertainty metrics extracted from both model's confidence a fixing criteria is defined. FIG. 2 graphically depicts how the fixing criteria is applied to Fixing Rules for source code tokens using probabilistic distribution criteria for fixing sequence tokens 200. Essentially, getting high confidence levels (low uncertainty and high certainty) at AST tokens predictions and low confidence levels (high uncertainty and low certainty) at source code tokens predictions provides a clear indicator that the system should apply the Fixing Rules to such source code tokens. As further illustrated, in some cases source code tokens are fixed based on rules, while in other cases source code tokens are fixed based on a Genetic Programming (GP) procedure.

In addition, if the source code token is generating an error (e.g., a syntax error detected by an Interpreter or a Compiler) and both the source code and AST models have good confidence levels but AST from the Decode source code does not match with the Decoded AST token then a Deterministic Grammar Dictionary is searched to replace the token. This operation may be repeated, if necessary.

Figure 3:
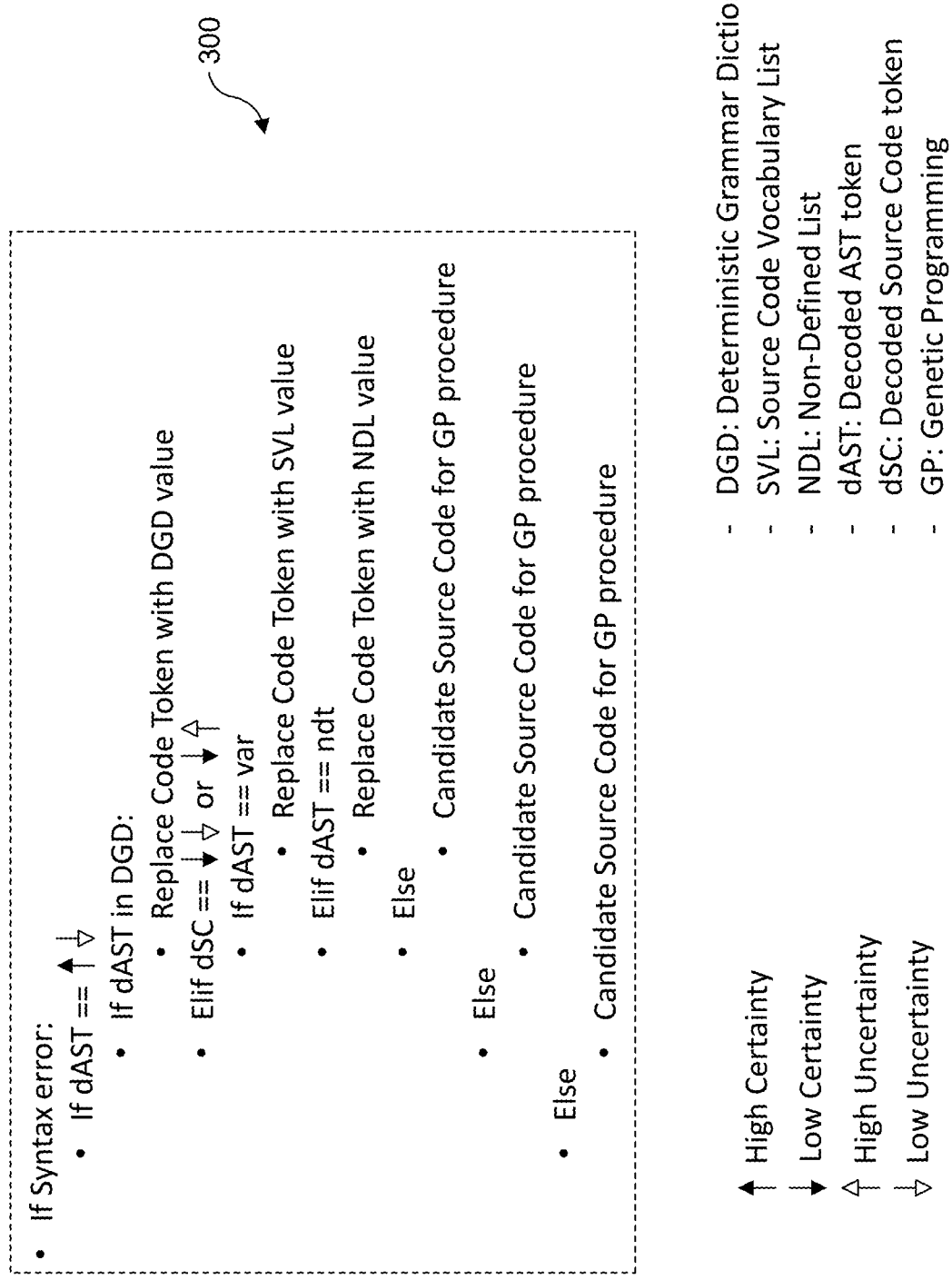
FIG. 3 is a diagram illustrating pseudocode logic used for selecting fixing rules to be applied in response to a syntax error and based on probabilistic distribution data from source code and AST tokens.

An example of pseudocode 300 for implementing decoded source code fixing rules in view of syntax errors is shown in FIG. 3. The Fixing Rules allows the system to apply a small set of deterministic rules only on source code tokens with lower confidence levels, not to all of them. Accordingly, this approach may dramatically decrease the time for getting a more accurate result.

Rules are essentially an interpretation of output sequences confidence levels that starts when the generated source code throws a syntax error by a compiler or an interpreter, then the system apply the following rules (under one embodiment):

1. Syntactical replacement: When decoded AST token have a high confidence and decoded source code token have low confidence, use a "Deterministic Grammar Dictionary" to find a replacement.
2. Vocabulary replacement: When the decode AST token value refers to a variable type (var) token, then replace it with a random value from a "Vocabulary List". As an option, Cosine Similarity may be applied between words to prioritize the replacement.
3. Unknown replacement: When decoded AST token value refers to an unknown token (ndt: non-defined token), then replace the token from a random value of a "Non-Defined List." Optionally, a word similarity algorithm may be applied to prioritize the replacement iterations.
4. Greedy replacement: When the decoded AST token confidences are low, then pass the generated Source-Token to a greedier procedure; this could be a Genetic Programming process, for example. These kinds of procedures can be highly benefited with the metrics extracted from results.

Figure 4:
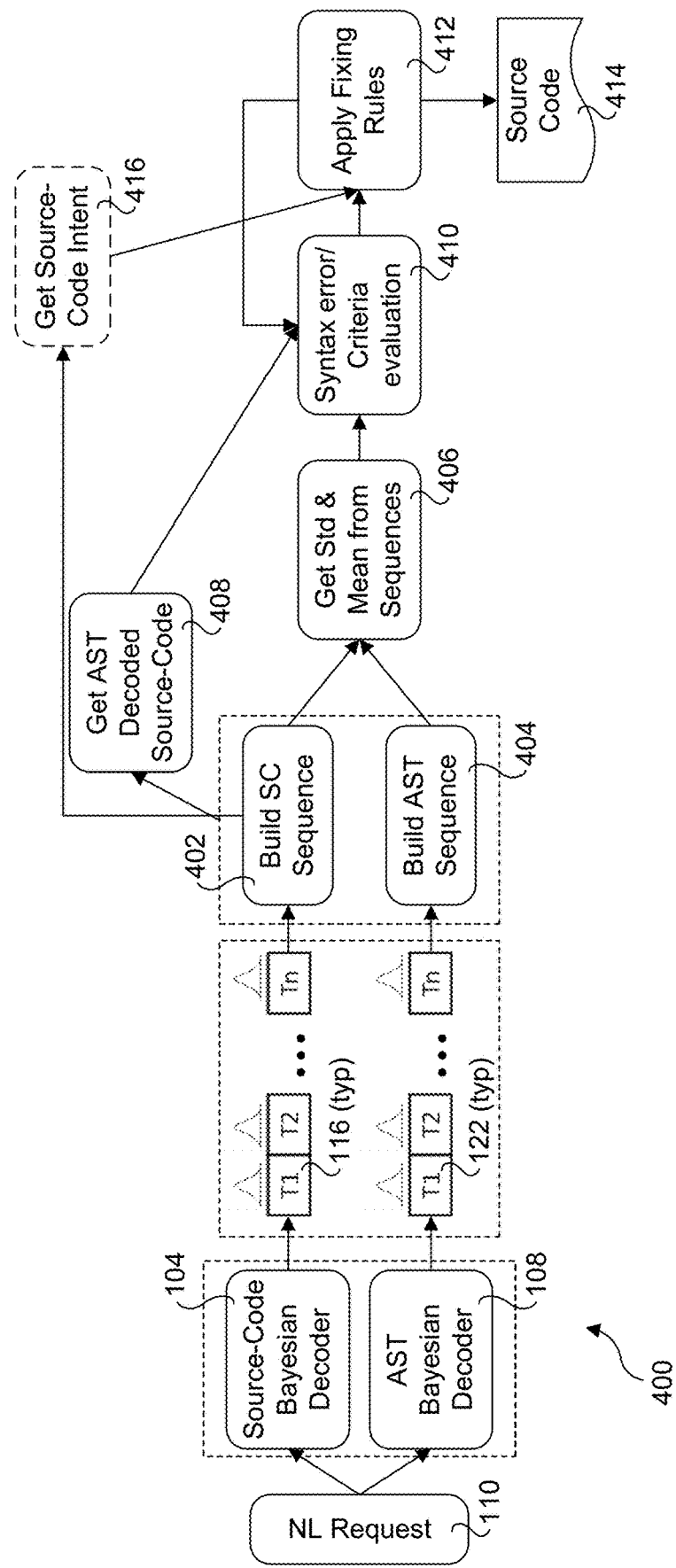
FIG. 4 is a schematic diagram illustrating an end-to-end process flow using the multi-model probabilistic source code model of FIG. 1a, according to one embodiment.

FIG. 4 shows a system architecture 400 for implementing the solution, according to one embodiment. The front-end components are the same as shown in FIG. 1a, but have been simplified to save space, with the illustrated components including NL request 110, source code Bayesian (LSTM) decoder 104 and AST Bayesian (LSTM) decoder 108, which respectively output source code token sequence 116 and AST token sequence 122, each having respective probability distributions.

Source code token sequence 116 is provided as an input to a block 402 in which a source code sequence is built. Similarly, AST token sequence 122 is provided as an input to a block 404 in which an AST sequence is built. In order to build a PD, each model generates a set of output sequences with different levels of Uncertainty (standard deviation (std)) and Certainty (mean) for each token. A single sequence is built from each model (one for source code and another for AST) output with the tokens with the maximum probability value of the probability distribution.

The outputs of blocks 402 and 404 are provided as inputs to a block 406 in which the std and mean are derived from the probability distributed data associated with the source code and AST tokens. As described above, the std and mean from each token sequence are used as Fixing Criteria. Output from block 404 is also used to get the AST decoded source code, as depicted in a block 408. The AST from output source code sequence is used for comparing against the output sequence from the AST Bayesian model.

Outputs from blocks 406 and 408 are provided as inputs to a block 410 in which syntax errors are detected and/or criteria evaluation is applied, as applicable. As described above, if a compiler or interpreter finds a syntax error, appropriate Fixing Rules are applied in a block 412. If there is no syntax error but AST from the decoded source code do not match with AST from the decoded AST model, then applicable rules may likewise be applied in block 412. As shown by the loopback from block 412 to block 410, after fixing rules are applied the resulting updated source code may be re-evaluated to optimize the output. This optimization process could also be performed with Genetic Programming. In one embodiment, the operations in blocks 410 and 412 are repeated until no syntax errors are detected and the criteria evaluation indicates no changes are to be applied. This output of the system is source code 414.

In some embodiments, source code intent (also referred to as "developer intent") may also be used, as depicted in an optional block 416. For example, in order to build more selective vocabulary, code with similar development-intent may be used as an additional input to be considered when applying fixing rules in block 412.

In one aspect, developer-intent comprising determining the intent of a code snippet, method, function, or other code block based on keywords and entities in the code and (optionally) comments. This technique extracts method names, method invocations, enums, string literals, and comments from the code. This technique uses text embedding to generate vector representations of the extracted features. Two vectors are close together in vector space if the words they represent often occur in similar contexts. This technique determines the intent of code as a weighted average of the embedding vectors. This technique returns code for a given natural language query by generating embedding vectors for the NL query, determining the intent of the NL query (e.g., via the weighted average), and performing a similarity search against weighted averages of methods.

Figures 5, 7:
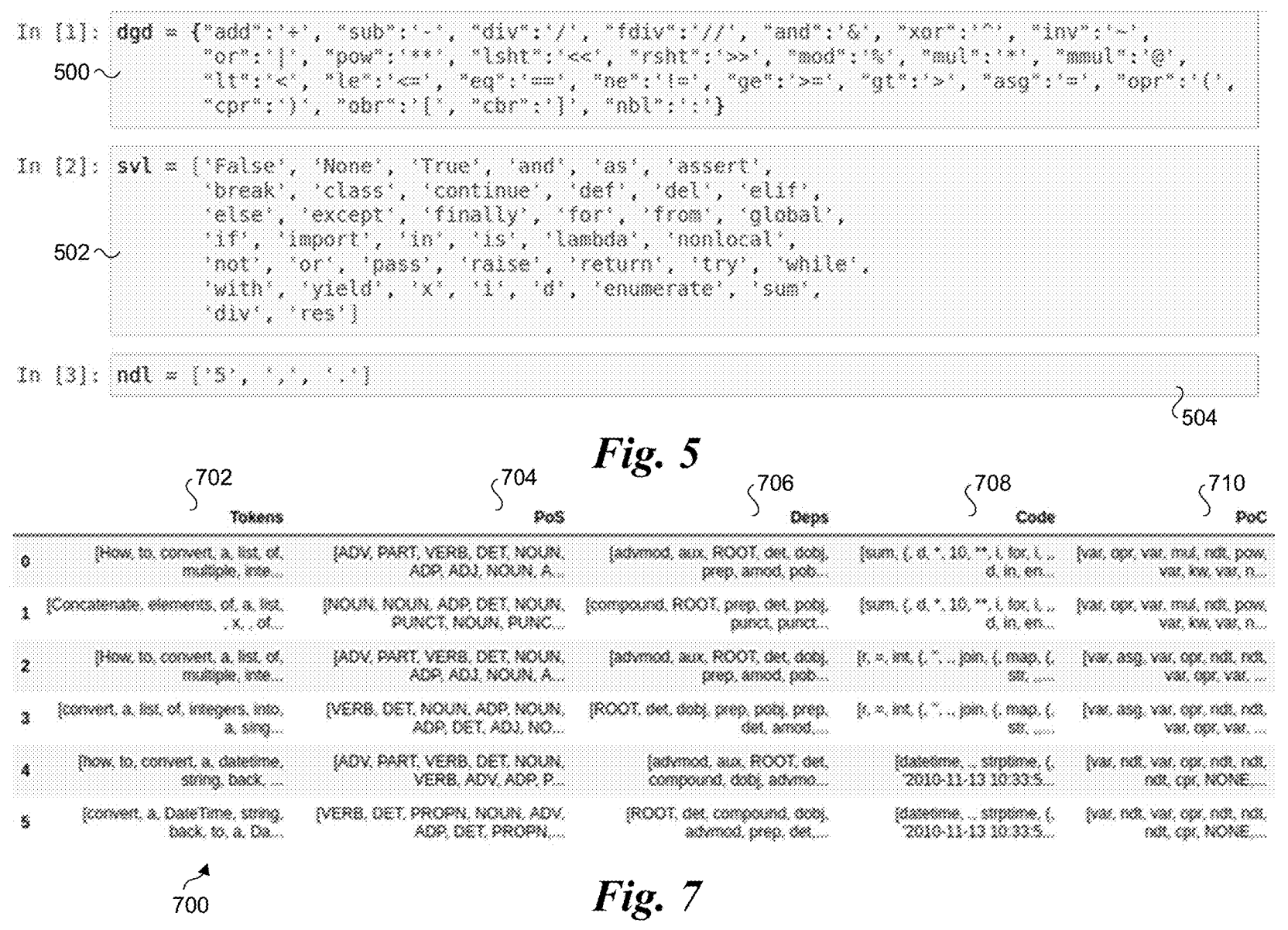

FIG. 5 shows examples of a Deterministic Grammar Dictionary (dgd) 500, a Source code Vocabulary List (svl) 502, and a Non-defined List (ndl) 504, which are used for replacing source code tokens. Dgd 500 contains pairwise sets comprising a text value and a source code token. The source code token (which may comprise an operator [list other options]) is substituted in place of the text value in the applicable seq2seq model. For example, the text "add" is replaced with the '+' operator, the text "sub" is replaced with the '−' operator, the text "div" is replaced by the '/' operator, etc.

Svl 502 includes a source code vocabulary list comprising tokens that may be present in source code, such as 'False', 'None', 'True', 'and', etc. The source code vocabulary list will depend on the type of source code that is to be generated. It is noted that svl 502 is a relatively small exemplary list—in practice, the svl for a given type of source code may be much larger.

ndl 504 shows a list of non-defined values that are not included in dgd 500 or svl 502. In this example, ndl 504 includes ['5', ',', '.']. Again, this is simplified for illustrative purposes, as an actual ndl may be much larger.

Figure 6:
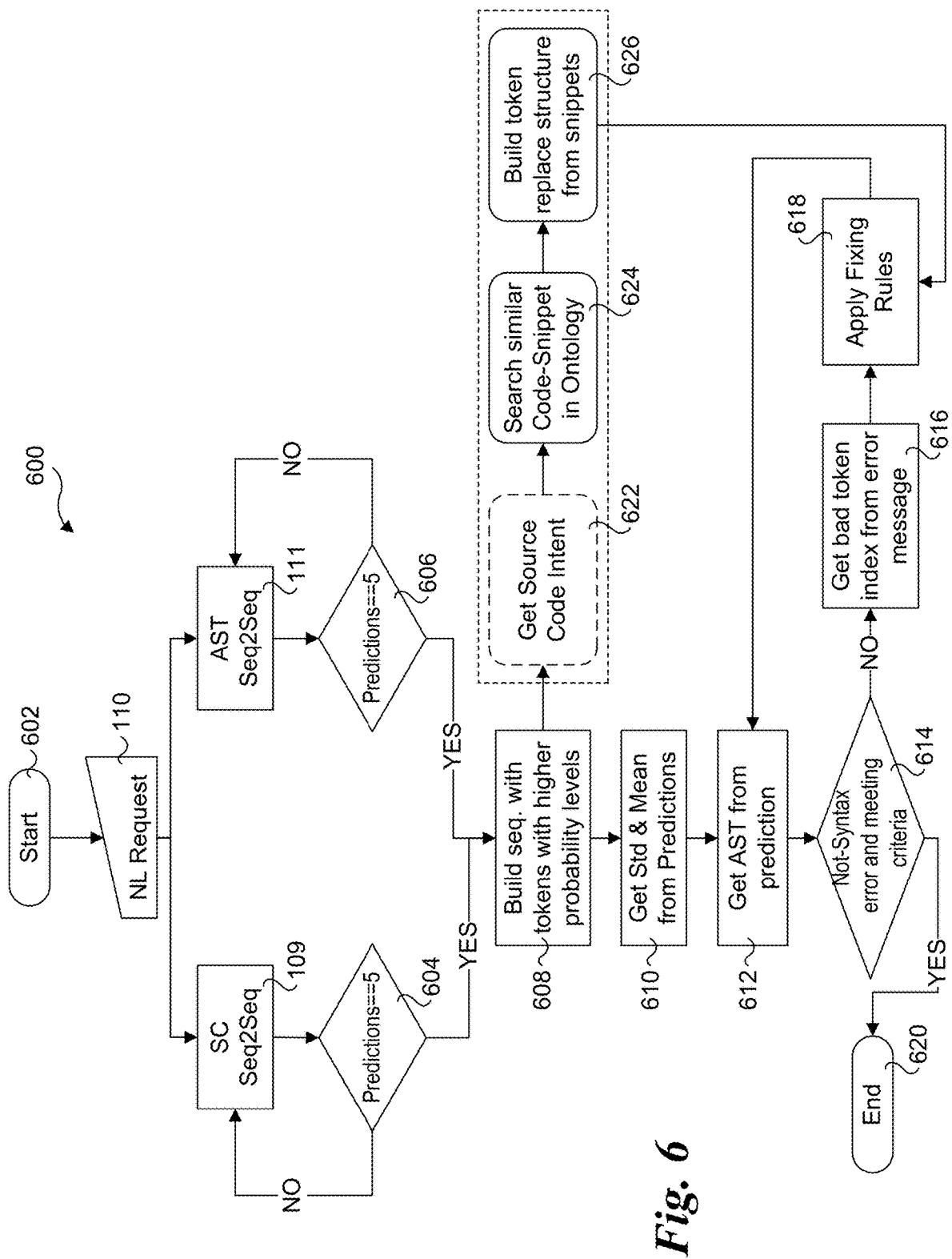
FIG. 6 is a flowchart illustrating operations and logic employed by the end-to-end process flow diagram of FIG. 4 to generate source code from an NL request, according to one embodiment.

FIG. 6 shows a flowchart 600 illustrating operations and logic for implementing the encoding-decoding process, according to one embodiment. Following start block 602, the process begins with NL request 110, which is provided as input to Text2Code seq2seq model 109 and Text2AST seq2seq model 111, as illustrated above in FIG. 1a. As depicted by a decision block 604, in the illustrated embodiment, predictions comprising the output source code token sequence 116 of Text2Code seq2seq model 109 are evaluated and re-evaluated 5 times, with 5 being an exemplary number of iterations. Similarly, as depicted by a decision block 604, predictions comprising the output AST token sequence 122 of Text2AST seq2seq model 111 are evaluated and re-evaluated 5 times.

The revised token sequence outputs of source code seq2seq model 109 and AST seq2seq model 111 are provided as inputs to a block 608 in which sequences are built with tokens with higher probability levels. Next, in a block 610 the standard deviation and mean from the predictions are retrieved and used to get the AST tokens from the predictions in a block 612.

In a decision block 614 a determination is made to whether there are any syntax errors and whether the matching criteria is met. If the answer is NO, the logic proceeds to a block 616 in which a "bad" token index is retrieved from an error messaged output from decision block 614 and applicable Fixing rules are applied in a block 618. After the Fixing rules are applied, the revised token sequence is fed back to block 612 and the operations of decision block 614 and blocks 616 and 618 are repeated until the answer to decision block 614 is YES, at which point the source code is output and the process completes, as depicted by an end block 620.

As an option, one or more optimizations employing developer-intent and/or similar source code snippets may be applied to the process. For example, this may include getting the source code intent, as shown in a block 622 using the manner described above. Another optimization searches similar code snippets in an ontology, as shown in a block 624. In a block 626, a token replace structure is built from the similar code snippets that are identified in block 624. The revised token sequence output from block 626 is provided as an input to block 618.

Experimental Results and Example Models

As a Proof of Concept, the two Bayesian Seq2Seq source code and AST models were implemented using Keras/TensorFlow. The models were trained using "The Code/Natural Language Challenge" (CoNaLa) dataset. This dataset, which comprises a JSON file that is available at https://conala-corpus.github.io/, contains NL samples derived from Stack Overflow questions and their corresponding Python snippets. FIG. 7 show an example of a small portion of the CoNaLa dataset comprising a Pandas data frame 700 obtained by processing the JSON file.

The columns in data frame 700 include a Tokens column 702, a PoS (Parts of Speech) column 704, a Deps (Dependents) column 706, a Code column 708, and a PoC (Parts of Code) column 710. Tokens column 702 contains a sequence of NL tokens delineated by commas. Respective tokens are translated into Parts of Speech, as shown in PoS column 704.

Each entry in Deps columns 706 is an input sequence comprising a set of labels of the Syntactical Relation Dependencies of each token in the input requirement. A Deps input sequence is used like a discriminant feature vector in combination with Word Tokens and Part of Speech to enable the encoders to better represent the meaning of the NL sentence. The Deps input sequence is one of the three input sequences to the Bayesian ED models.

Code column 708 contains the target sequence for the source code decoder (e.g., Target source code tokens 114 in FIG. 1a). PoC column 710 contains the sequence representation of the corresponding AST which is the target for the AST decoder.

Figure 8:
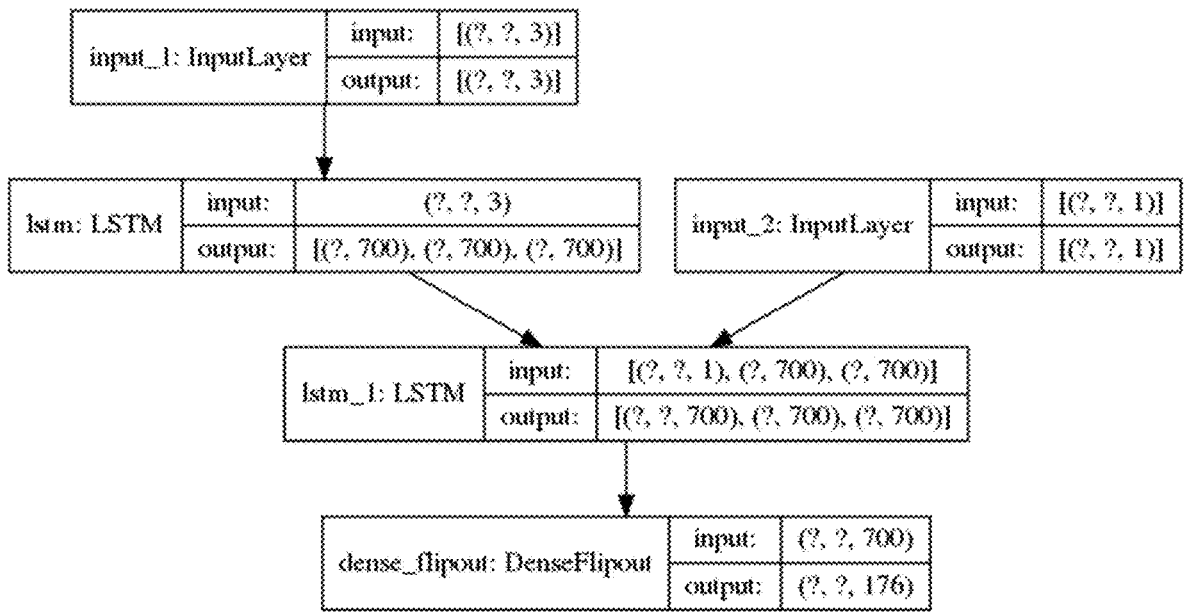
FIG. 8 is a diagram illustrating the topology of a Bayesian Encoder-Decoder deep learning (DL) model used for the Text2AST transformations.

FIG. 8 shows the Bayesian Encoder-Decoder DL model topology used for the Text2AST transformations implemented by AST Bayesian ED model 111. In the topology, '?' values are variable and are dependent on the input provided at the InputLayer. Meanwhile, integer values such as '3', '700', and '19' specify the number of nodes along an associated dimension. Under TensorFlow, a DenseFlipout layer implements the Bayesian variational inference analogue to a dense layer by assuming the kernel and/or the bias are drawn from distributions. By default, the layer implements a stochastic forward pass via sampling from the kernel and bias posteriors. This layer uses the Flipout estimator describe in Wen, Yeming, et al. "Flipout: Efficient pseudo-independent weight perturbations on mini-batches." *arXiv preprint arXiv:*1803.04386 (2018), which performs a Monte Carlo approximation of the distribution integrating over the kernel and the bias.

Figure 9:
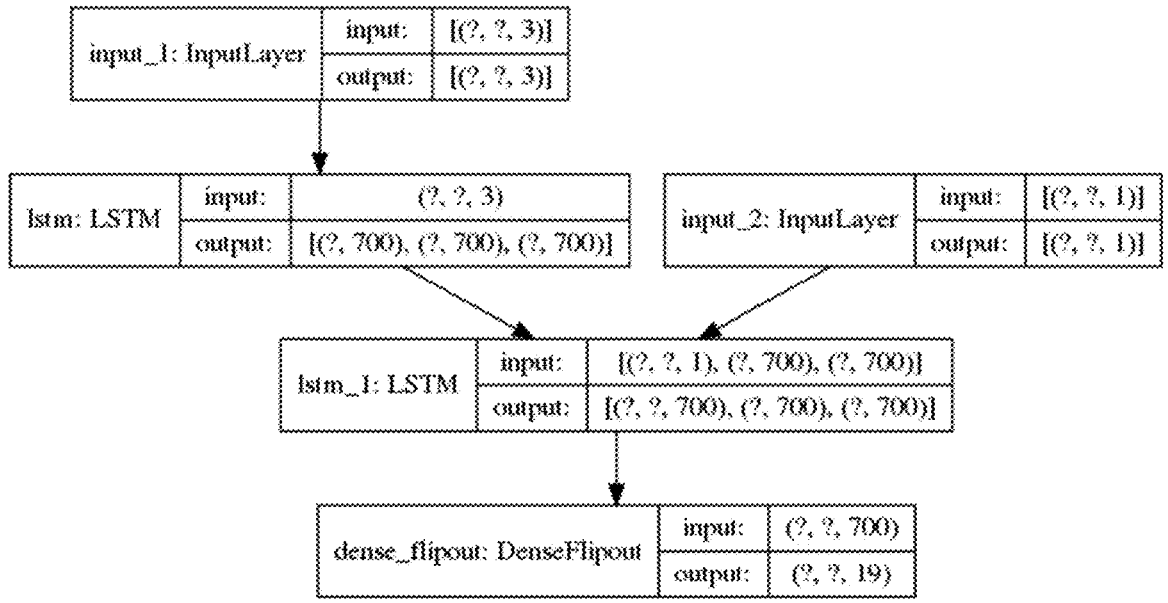
FIG. 9 is a diagram illustrating the topology of a Bayesian Encoder-Decoder deep DL model used for the Text2Code transformations.

FIG. 9 shows the Bayesian Encoder-Decoder DL model topology for the Text2Code transformations implemented by the Text2Code Bayesian ED model 109. As will be recognized, the Bayesian Encoder-Decoder DL model topology for Text2Code transformations is substantially identical to that used for the Text2 AST transformations, except the dimension of the output of the DenseFlipout layer is substantially smaller (19 vs. 196) since the AST vocabulary is smaller than the source code vocabulary.

Example Results

Example results for the input sequence "concatenate elements of a list x of multiple integers to a single integer" is shown in FIG. 1b. Using the process illustrated in FIGS. 1a, 2-4, and flowchart 600 of FIG. 6, the system will iterate 6 times over the predicted source code sequence due to the number of syntactical errors thrown by the Python interpreter (six errors). In column 7, although the certainty and uncertainty values for the SC decode token 'for' indicate high confidence, the interpreter would through an error here, causing a fixing rule to be applied. Based on the high confidence of the AST Decoded token, the fixing rule is to replace 'for' with '**', which corresponds to a pow (power) AST token from Deterministic Grammar Dictionary (dgd) 500 in FIG. 5. As its evident, only 6 iterations would be needed to generate an interpretable code from the output of the Bayesian Encoder-Decoder models. In contrast, current implementations may take 23 iterations (one for each AST token) to traverse the entire AST sequence representation. Thus, this experimental result is highlighting a 4× times speed up using the innovative approach disclosed herein.

Example Platform/Server

Figure 10:
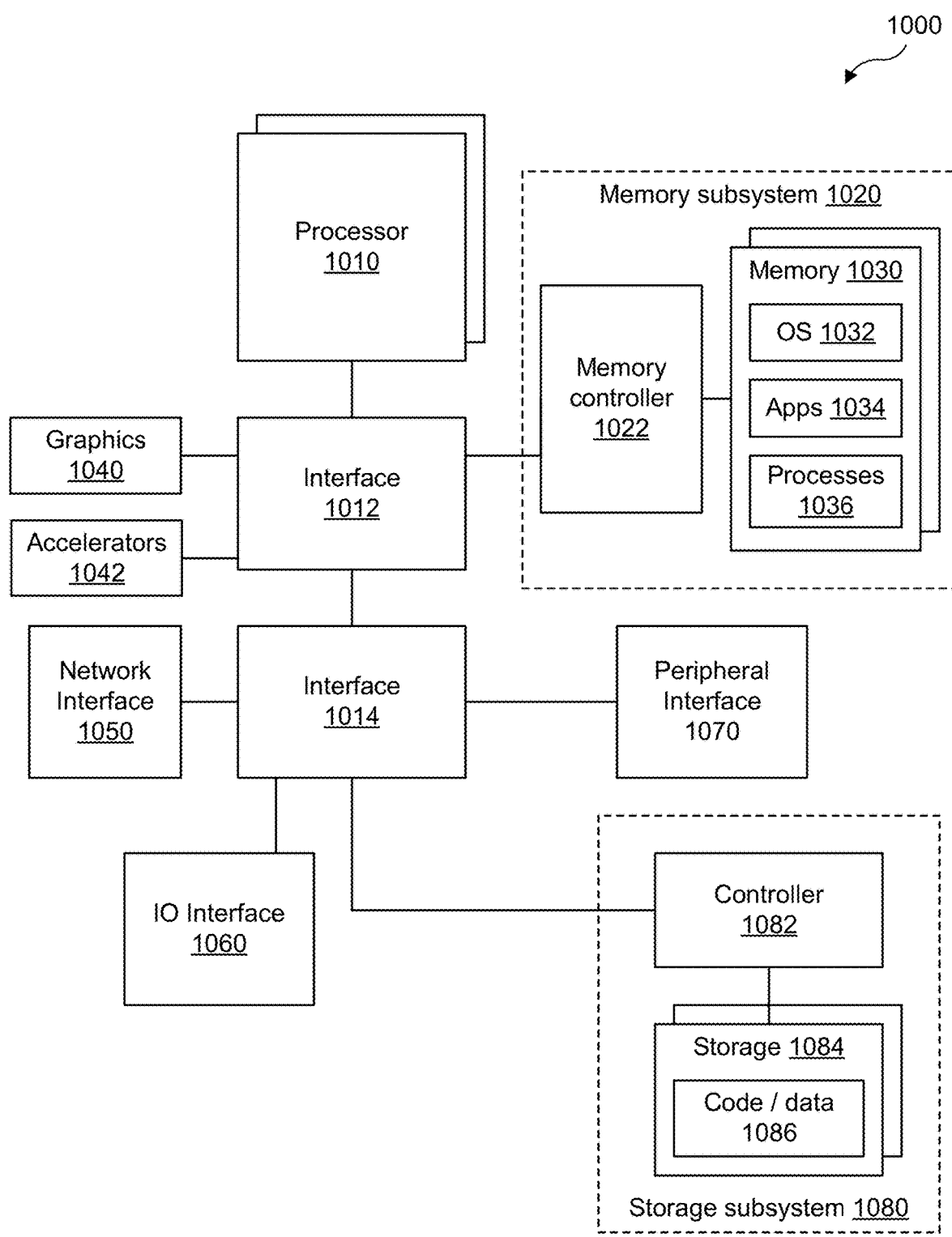
FIG. 10 is a diagram of a compute platform or server that may be used to implement aspects of the embodiments described and illustrated herein.

FIG. 10 depicts a compute platform 1000 such as a server or similar computing system in which aspects of the embodiments disclosed above may be implemented. Compute platform 1000 includes one or more processors 1010, which provides processing, operation management, and execution of instructions for compute platform 1000. Processor 1010 can include any type of microprocessor, central processing unit (CPU), graphics processing unit (GPU), processing core, multi-core processor or other processing hardware to provide processing for compute platform 1000, or a combination of processors. Processor 1010 controls the overall operation of compute platform 1000, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In some embodiments, processing may be split between a CPU and a GPU. For example, it is common to implement TensorFlow on compute platforms including a CPU and a GPU. In some embodiments the CPU and GPU are separate components. In other embodiments, a CPU and GPU may be implemented in a System on a Chip (SoC) or in a multi-chip module or the like.

In one example, compute platform 1000 includes interface 1012 coupled to processor 1010, which can represent a higher speed interface or a high throughput interface for system components that needs higher bandwidth connections, such as memory subsystem 1020 or optional graphics interface components 1040, or optional accelerators 1042. Interface 1012 represents an interface circuit, which can be a standalone component or integrated onto a processor die. Where present, graphics interface 1040 interfaces to graphics components for providing a visual display to a user of compute platform 1000. In one example, graphics interface 1040 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1040 generates a display based on data stored in memory 1030 or based on operations executed by processor 1010 or both. In one example, graphics interface 1040 generates a display based on data stored in memory 1030 or based on operations executed by processor 1010 or both.

In some embodiments, accelerators 1042 can be a fixed function offload engine that can be accessed or used by a processor 1010. For example, an accelerator among accelerators 1042 can provide data compression capability, cryptography services such as public key encryption (PKE), cipher, hash/authentication capabilities, decryption, or other capabilities or services. In some embodiments, in addition or alternatively, an accelerator among accelerators 1042 provides field select controller capabilities as described herein. In some cases, accelerators 1042 can be integrated into a CPU socket (e.g., a connector to a motherboard or circuit board that includes a CPU and provides an electrical interface with the CPU). For example, accelerators 1042 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1042 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1020 represents the main memory of compute platform 1000 and provides storage for code to be executed by processor 1010, or data values to be used in executing a routine. Memory subsystem 1020 can include one or more memory devices 1030 such as read-only memory (ROM), flash memory, one or more varieties of random access memory (RAM) such as DRAM, or other memory devices, or a combination of such devices. Memory 1030 stores and hosts, among other things, operating system (OS) 1032 to provide a software platform for execution of instructions in compute platform 1000. Additionally, applications 1034 can execute on the software platform of OS 1032 from memory 1030. Applications 1034 represent programs that have their own operational logic to perform execution of one or more functions. Processes 1036 represent agents or routines that provide auxiliary functions to OS 1032 or one or more applications 1034 or a combination. OS 1032, applications 1034, and processes 1036 provide software logic to provide functions for compute platform 1000. In one example, memory subsystem 1020 includes memory controller 1022, which is a memory controller to generate and issue commands to memory 1030. It will be understood that memory controller 1022 could be a physical part of processor 1010 or a physical part of interface 1012. For example, memory controller 1022 can be an integrated memory controller, integrated onto a circuit with processor 1010.

While not specifically illustrated, it will be understood that compute platform 1000 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, compute platform 1000 includes interface 1014, which can be coupled to interface 1012. In one example, interface 1014 represents an interface circuit, which can include standalone components and integrated circuitry. In one example, multiple user interface components or peripheral components, or both, couple to interface 1014. Network interface 1050 provides compute platform 1000 the ability to communicate with remote devices (e.g., servers or other computing devices) over one or more networks. Network interface 1050 can include an Ethernet adapter, wireless interconnection components, cellular network interconnection components, USB (universal serial bus), or other wired or wireless standards-based or proprietary interfaces. Network interface 1050 can transmit data to a device that is in the same data center or rack or a remote device, which can include sending data stored in memory. Network interface 1050 can receive data from a remote device, which can include storing received data into memory. Various embodiments can be used in connection with network interface 1050, processor 1010, and memory subsystem 1020.

In one example, compute platform 1000 includes one or more IO interface(s) 1060. IO interface 1060 can include one or more interface components through which a user interacts with compute platform 1000 (e.g., audio, alphanumeric, tactile/touch, or other interfacing). Peripheral interface 1070 can include any hardware interface not specifically mentioned above. Peripherals refer generally to devices that connect dependently to compute platform 1000. A dependent connection is one where compute platform 1000 provides the software platform or hardware platform or both on which operation executes, and with which a user interacts.

In one example, compute platform 1000 includes storage subsystem 1080 to store data in a nonvolatile manner. In one example, in certain system implementations, at least certain components of storage 1080 can overlap with components of memory subsystem 1020. Storage subsystem 1080 includes storage device(s) 1084, which can be or include any conventional medium for storing large amounts of data in a nonvolatile manner, such as one or more magnetic, solid state, or optical based disks, or a combination. Storage 1084 holds code or instructions and data 1086 in a persistent state (i.e., the value is retained despite interruption of power to compute platform 1000). Storage 1084 can be generically considered to be a "memory," although memory 1030 is typically the executing or operating memory to provide instructions to processor 1010. Whereas storage 1084 is nonvolatile, memory 1030 can include volatile memory (i.e., the value or state of the data is indeterminate if power is interrupted to compute platform 1000). In one example, storage subsystem 1080 includes controller 1082 to interface with storage 1084. In one example controller 1082 is a physical part of interface 1014 or processor 1010 or can include circuits or logic in both processor 1010 and interface 1014.

Volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5), LPDDR5, HBM2E, HBM3, and HBM-PIM, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In an example, compute platform 1000 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), Intel® On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

In addition to systems with CPUs, the teaching and principles disclosed herein may be applied to Other Processing Units (collectively termed XPUs) including one or more of Graphic Processor Units (GPUs) or General Purpose GPUs (GP-GPUs), Tensor Processing Units (TPUs), Data Processor Units (DPUs), Infrastructure Processing Units (IPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU in the illustrated embodiments. Moreover, as used in the following claims, the term "processor" is used to generically cover CPUs and various forms of XPUs.

As will be recognized by those skilled in the art, implementation of ML frameworks, such as but not limited to TensorFlow, may employ a single machine (compute platform, server, compute node, etc.) or may employ distributed set of machines. Accordingly, a system used to implement the ML models described and illustrated herein may include compute resources (e.g., a processor, memory, etc.) for a single compute platform/server/node or a set of interconnected compute platforms, servers, or nodes. Moreover, processes may be distributed over a set of compute resources in a single machine, such as distributed across CPU cores in a multi-core processor, distributed between a CPU and a GPU, distributed among multiple GPUs, or more generally distributed across multiple processors comprising CPUs and XPUs.

In some embodiments, a system used for training the ML models may be different than the compute platform used to implement trained models. For example, since training generally consumes more compute resources than using trained models, training may be performed using a distributed set of compute nodes or the like, while the trained model might be implemented on a single compute node/platform/server etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method for generating source code from a Natural Language (NL) input, comprising:
  processing the NL input to generate a Probabilistic Distribution (PD) of Source code (SC) tokens in an SC token sequence;
  processing the NL input to generate a PD of Abstract Syntax Tree (AST) tokens in an AST token sequence;
  identifying one or more SC tokens to be fixed; and
  applying one or more fixing rules to the one or more SC tokens that are identified, wherein the fixing rule for a given SC token is selected based on at least one of the PD of the SC token and the PD of an AST token associated with the SC token.

2. The method of claim 1, wherein identifying an SC token to be fixed comprises:
at least one of compiling an SC token sequence with a compiler and interpreting an SC token sequence with an interpreter; and
detecting an SC token that causes the compiler or interpreter to throw a syntax error.

3. The method of claim 1, further comprising:
determining an SC token has a low confidence level and the associated AST token has a high confidence level; and
using a deterministic grammar dictionary to replace the SC token.

4. The method of claim 1, further comprising:
determining an AST token associated with an SC token has a low confidence level and is a variable (var); and
replacing the SC token with an entry in a source code vocabulary list.

5. The method of claim 1, further comprising:
determining an AST token associated with an SC token has a low confidence level and is not a variable (var); and
employing a genetic programming process to replace the SC token.

6. The method of claim 1, wherein the PD of the SC tokens is generated by a Text-to-source code (Text2Code) machine learning (ML) model.

7. The method of claim 6, wherein the Text2Code ML model comprises a Long Short-Term Memory (LSTM) encoder and a Source Code Bayesian LSTM decoder that outputs a sequence of decoded SC tokens.

8. The method of claim 1, wherein the PD of the AST tokens is generated by a Text-to-AST (Text2AST) machine learning (ML) model.

9. The method of claim 8, wherein the Text2AST ML model comprises a Long Short-Term Memory (LSTM) encoder and an AST Bayesian LSTM decoder that outputs a sequence of decoded AST tokens.

10. The method of claim 1, wherein a PD for an SC token comprises a mean associated with a level of certainty to whether the SC token is a match and a standard deviation associated with a level of uncertainty to whether the SC token is a match, wherein a PD for an AST token comprises a mean associated with a level of certainty to whether the AST token is a match and a standard deviation associated with a level of uncertainty to whether the AST token is a match, and wherein selection of the fixing rule employs at least one of the level of certainty and the level of uncertainty for at least one of an SC token and its associated AST token.

11. A non-transitory machine-readable medium having instructions stored thereon configured to be executed on one or more processors on a computing system to generate source code from a Natural Language (NL) input, wherein execution of the instructions causes the computing system to:
process the NL input to generate a Probabilistic Distribution (PD) of Source code (SC) tokens in an SC token sequence;
process the NL input to generate a PD of Abstract Syntax Tree (AST) tokens in an AST token sequence;
identify one or more SC tokens to be fixed; and
apply one or more fixing rules to the one or more SC tokens that are identified, wherein the fixing rule for a given SC token is selected based on at least one of the PD of the SC token and the PD of an AST token associated with the SC token.

12. The non-transitory machine-readable medium of claim 11, wherein a portion of the instructions comprise a Text-to-AST (Text2AST) machine learning (ML) model comprising a Long Short-Term Memory (LSTM) encoder and an AST Bayesian LSTM decoder that outputs a sequence of decoded AST tokens.

13. The non-transitory machine-readable medium of claim 11, wherein a portion of the instructions comprise a Text-to-source code (Text2Code) machine learning (ML) model comprising a Long Short-Term Memory (LSTM) encoder and an AST Bayesian LSTM decoder that outputs a sequence of decoded source code tokens.

14. The non-transitory machine-readable medium of claim 11, wherein a PD for an SC token comprises a mean associated with a level of certainty to whether the SC token is a match and a standard deviation associated with a level of uncertainty to whether the SC token is a match, wherein a PD for an AST token comprises a mean associated with a level of certainty to whether the AST token is a match and a standard deviation associated with a level of uncertainty to whether the AST token is a match, and wherein selection of the fixing rule employs at least one of the level of certainty and the level of uncertainty for at least one of an SC token and its associated AST token.

15. The non-transitory machine-readable medium of claim 11, wherein execution of the instructions further causes the computing system to:
determine an SC token has a low confidence level and its associated AST token has a high confidence level; and
use a deterministic grammar dictionary to replace the SC token.

16. The non-transitory machine-readable medium of claim 11, wherein execution of the instructions further causes the computing system to:
determine an AST token associated with an SC token has a low confidence level and is a variable (var); and
replace the SC token with an entry in a source code vocabulary list.

17. A computing system comprising:
one or more processors,
memory, coupled to the one or more processors, having instructions stored therein configured to be executed on at least one of the one or more processors to enable the system to:
process a natural language (NL) input to generate a Probabilistic Distribution (PD) of Source code (SC) tokens in an SC token sequence;
process the NL input to generate a PD of Abstract Syntax Tree (AST) tokens in an AST token sequence;
identify one or more SC tokens to be fixed; and
apply one or more fixing rules to the one or more SC tokens that are identified, wherein the fixing rule for a given SC token is selected, at least in part, based on at least one of the PD of the SC token and the PD of an AST token associated with the SC token.

18. The computing system of claim 17, wherein a first portion of the instructions comprise a Text-to-AST (Text2AST) machine learning (ML) model comprising a Long Short-Term Memory (LSTM) encoder and an AST Bayesian LSTM decoder that outputs a sequence of decoded AST tokens, and wherein a second of the instructions comprise a Text-to-source code (Text2Code) machine learning (ML) model comprising a Long Short-Term Memory (LSTM) encoder and an AST Bayesian LSTM decoder that outputs a sequence of decoded source code tokens.

19. The computing system of claim 17, wherein a PD for an SC token comprises a mean associated with a level of certainty to whether the SC token is a likely match and a standard deviation associated with a level of uncertainty to whether the SC token is a match, wherein a PD for an AST token comprises a mean associated with a level of certainty to whether the AST token is a likely match and a standard deviation associated with a level of uncertainty to whether the AST token is a match, and wherein selection of the fixing rule employs at least one of the level of certainty and the level of uncertainty for at least one of an SC token and its associated AST token.

20. The computing system of claim 17, wherein execution of the instructions enables the system to:
- receive one or more NL input requests; and
- automatically generate source code snippets corresponding to the one or more NL input requests.

\* \* \* \* \*